(12) United States Patent
Groh et al.

(10) Patent No.: US 8,670,062 B2
(45) Date of Patent: Mar. 11, 2014

(54) METHOD FOR NOISE CORRECTION FOR A FLAT-PANEL DETECTOR

(75) Inventors: Burkhard Groh, Chicago, IL (US);
Volker Heer, Gundelsheim (DE);
Mathias Hörnig, Erlangen (DE);
Bernhard Sandkamp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 13/097,602

(22) Filed: Apr. 29, 2011

(65) Prior Publication Data

US 2011/0198508 A1 Aug. 18, 2011

Related U.S. Application Data

(63) Continuation of application No. 11/092,795, filed on Mar. 29, 2005, now Pat. No. 7,965,333.

(30) Foreign Application Priority Data

Mar. 31, 2004 (DE) .......................... 10 2004 016 587

(51) Int. Cl.
*H04N 9/64* (2006.01)
*H04N 5/225* (2006.01)

(52) U.S. Cl.
USPC .......................................................... 348/343

(58) Field of Classification Search
USPC ......... 348/241, 243, 245–247; 378/207, 98.5, 378/98.8; 250/208.1, 370.08, 370.09
See application file for complete search history.

(56) References Cited

U.S. PATENT DOCUMENTS

| | | | |
|---|---|---|---|
| 6,453,008 B1 * | 9/2002 | Sakaguchi et al. ............ | 378/98.7 |
| 6,724,855 B2 * | 4/2004 | Sugawara et al. ................ | 378/19 |
| 7,050,098 B2 * | 5/2006 | Shirakawa et al. ............ | 348/245 |
| 2002/0140830 A1 * | 10/2002 | Shirakawa et al. ............ | 348/245 |
| 2003/0202111 A1 * | 10/2003 | Park .............................. | 348/243 |
| 2005/0219388 A1 * | 10/2005 | Hornig ........................... | 348/241 |

* cited by examiner

*Primary Examiner* — Twyler Haskins
*Assistant Examiner* — Carramah J Quiett

(57) ABSTRACT

For noise correction in connection with a flat-panel x-ray detector, noise signals of a dark reference area are checked for deviations exceeding a specified threshold which, if any are present, will be taken into consideration separately for calculating the correction factor derived from the noise signal. Image artifacts due, for example, to high-contrast objects such as, for instance, cardiac pacemakers or metallic implants, in the x-ray image will be avoided through this measure.

15 Claims, 1 Drawing Sheet

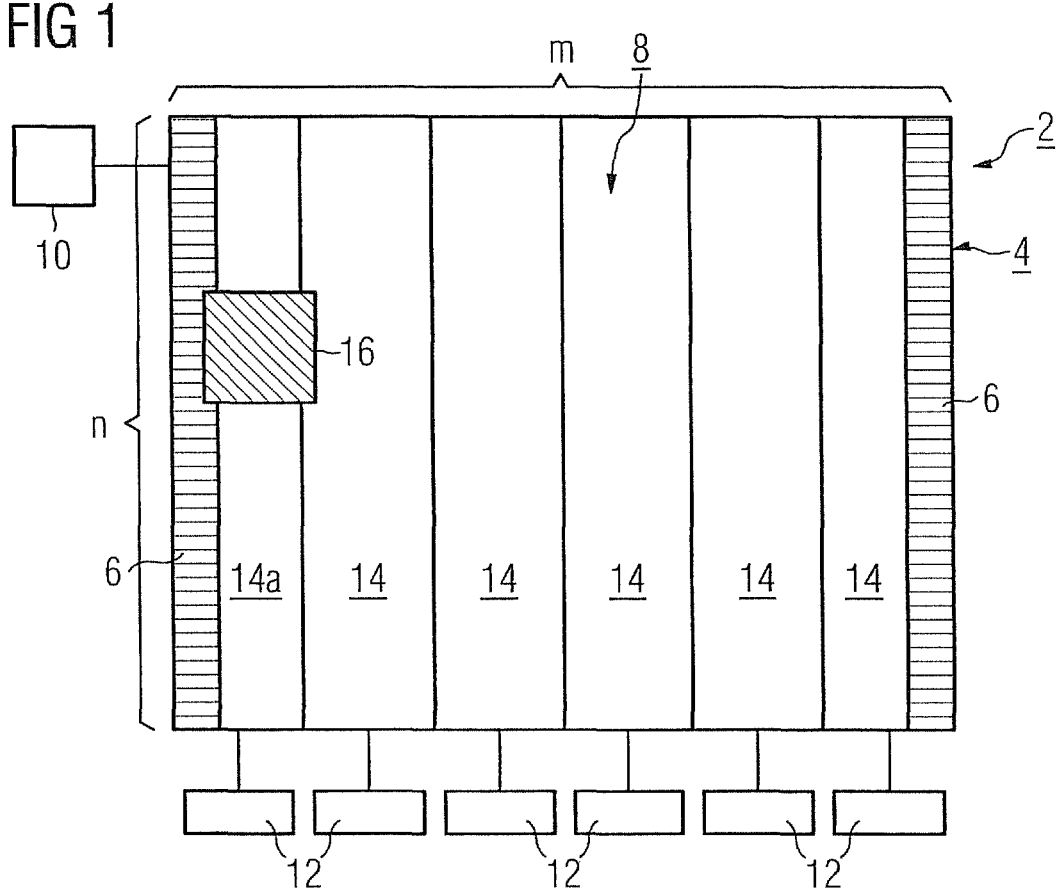
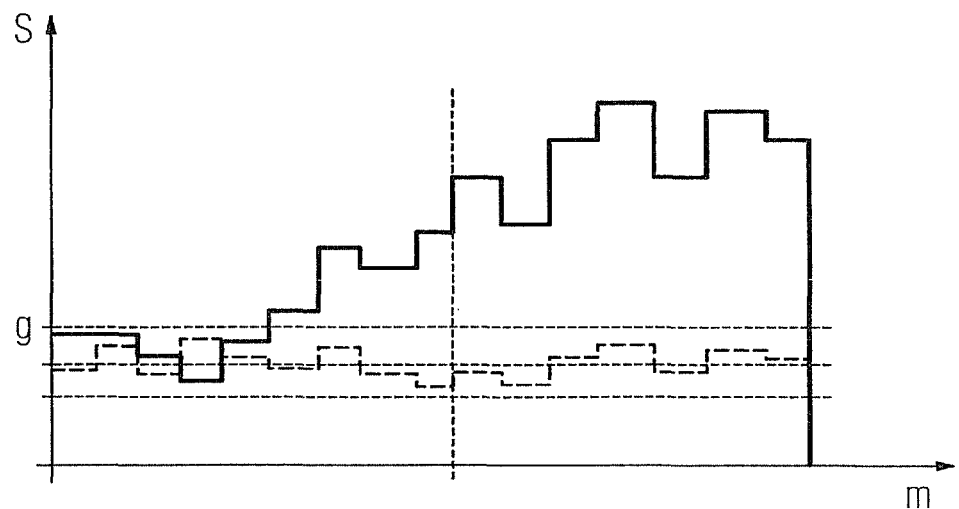

METHOD FOR NOISE CORRECTION FOR A FLAT-PANEL DETECTOR

CROSS REFERENCE TO RELATED APPLICATIONS

This application is a continuation of U.S. Ser. No. 11,092,795 filed Mar. 29, 2005 now U.S. Pat. No. 7,965,333 and claims priority to the German application No. 10 2004 016 587.4 filed Mar. 31, 2004. All of the applications are incorporated by reference herein in its entirety.

FIELD OF INVENTION

The invention relates to a method for noise correction in the acquisition of, in particular, x-rays by means of a flat-panel detector.

BACKGROUND OF INVENTION

A flat-panel detector of said type usually has an amorphous silicon (aSi) flat panel that is divided into individual pixel arrays and of which at least a subarea is provided with a photo-active coating forming the scintillator layer. Said photo-active coating converts impinging x-rays into light pulses which are then detected by a semiconductor sensor assigned to the respective pixel array and forwarded as an electrical signal to a readout amplifier. Each of the pixel arrays arranged in lines and columns has a semiconductor sensor of said type. The individual pixel arrays form a matrix array.

A plurality of readout amplifiers are usually provided which in turn have a plurality of channels, for example 120, for the respective columns of the matrix array. One column is therefore read out via each channel, this process taking place line by line, which is to say serially. The detected light intensity is aggregated in the individual semiconductor sensors during the time that elapses between two readout operations.

SUMMARY OF INVENTION

Owing to the plurality of electronic components employed, in particular owing to the readout amplifiers, the actual light signals are superimposed with noise, in particular line noise. In order to reduce said noise, the flat-panel detector is usually subdivided into an active area, which is exposed to the x-rays, and at least one dark area, referred to also as a "Dark Reference Zone (DRZ)", which in particular does not have a photo-active layer. The noise to be assigned to the dark area is detected and used as a correction value for the signals detected by the active area (line noise correction: LNC).

If a high-contrast object such as a cardiac pacemaker or metallic implant is located in the path of the rays at the edge of the image, which is to say at the edge of the active area and in the vicinity of the dark area, there will be an area of very high light intensity in the immediate vicinity of the dark area. Said light can as a result also radiate into the dark area so that significantly increased signal values will be registered by the corresponding readout amplifier. At the edge of said object there will additionally be a high-contrast transition from one line to the next line within a readout amplifier. This abrupt change in contrast will produce a kind of high-frequency structure that will in part be visible over the entire line. This effect is also described as matrix vertical high-pass behavior of the readout amplifier.

Owing not least to radiation into the dark area, employed ultimately, of course, for noise correction of the line noise, increased line noise will be incorrectly assumed and noise correction will produce unsatisfactory results. Line structures that are undesirable and disadvantageous for clinical image evaluation will as a result be produced in the image.

An object of the invention is to enable improved noise correction.

Said object is achieved according to the invention by means of a method for noise correction in the acquisition of, in particular, x-rays by means of a solid-state flat-panel detector containing a matrix-type detector panel having at least one dark area and one active area and further containing a plurality of readout amplifiers for reading out line by line the signals detected in the detector panel. Noise signals for a line noise that are to be assigned to the dark area are detected and correction factors for the individual lines of the active area determined therefrom. The detected noise signals of the individual lines of the dark area are checked during this process for deviations that exceed a specified threshold. Any such impermissible deviations occurring are taken into consideration separately for calculating the correction factor.

Through this measure, in particular those instances are therefore registered in which high-contrast objects are located in the area of the edge of the image, which is to say near the dark area, and which would customarily give rise to the undesirable line structures in the clinical image. It is as though by means of the method here proposed those particular lines affected owing to a high-contrast object of said type are identified into which, for example, light radiates. Recognizing the affected lines in the first step is here the prerequisite for its being possible to take this into consideration in the second step for calculating the correction factor in order to enable improved noise correction.

A mean value of the noise signal across the lines of the dark area is here preferably used to determine the threshold characterizing a deviation as being an impermissible deviation. The mean value is in particular here produced in the dark image, which is to say without impinging x-rays, in order to ensure that only the electronic noise actually contributes to the signal. For the purposes of determining, the lines are therefore read out line by line, a mean line value is formed from the noise signal curve of the line, and a total mean value then calculated for the dark area from all the mean line values. The threshold is then determined by, for example, the mean value plus a tolerance value. Noise signals within this tolerance range are therefore identified as being permissible so that the noise values or noise signals can be used for determining the correction factor. Said threshold as a function of the mean value therefore forms a first criterion for the presence of an impermissible deviation.

According to a preferred embodiment an abrupt change in the noise signal between two successive lines is used additionally or alternatively as a further, second criterion for the presence of an impermissible deviation. Said second criterion is therefore very sensitive in the edge areas of the high-contrast object in which the abrupt changes in contrast occur.

A dark area's noise signal to be assigned to a respective line is composed of a plurality of individual noise values to be assigned to the columns of the dark area. A check is here carried out to determine whether individual noise values have an impermissible deviation. According to said preferred embodiment each pixel of an individual line of a dark area is therefore considered separately. In order to avoid distortions in determining the correction factor, noise values exhibiting an impermissible deviation of this type will preferably not be used for determining the correction factor.

The entire line of the dark area will furthermore preferably not be used for determining the correction factor if more than a specified permissible number of noise values have impermissible deviations. As the quality of the correction factor falls significantly with increasingly fewer individual values, a deterioration in the correction factor is thereby counteracted.

In order nonetheless to facilitate a meaningful correction factor for the affected line for the active area, the lines adjacent to the line having an impermissible deviation are used to determine the correction factors. The noise signal of, for example, the preceding line is therefore interpolated or the mean value is formed from two adjacent lines each not having impermissible deviations.

A predetermined correction factor in particular derived from the mean value of the noise signals of the lines of the dark area is used alternatively for the lines exhibiting an impermissible deviation. A meaningful correction factor can in this way be determined with comparatively modest effort.

The above embodiments relate in particular to a detector panel having only one dark area. Two dark areas are in part also employed for determining the correction factor, said areas being customarily located opposite each other on the edge sides of the detector panel. For this instance, in a preferred embodiment a noise signal is registered for the line noise for each of the dark areas and each of the noise signals is checked for impermissible deviations.

A mean line value is here to practical effect formed from the noise signal for a line of a respective dark area. The difference between the two mean values is then used as a further, third criterion for the presence of an impermissible deviation. This is therefore a relative criterion which compares the two noise signals of the dark areas with each other and draws conclusions therefrom. If, for example, there is a high-contrast object in an edge area, then the dark area adjacent to said object will have a significantly increased noise signal.

If there is an impermissible deviation for the noise signal for one of the dark areas, then only the noise signal of the further dark area or areas will to practical effect be used for determining the correction factor. When two dark areas are used it is therefore relatively easy to resort to the second, unaffected dark area for determining the correction factor.

The criteria and procedures proposed with regard to a detector panel having only one dark area can, of course, be applied equally to a detector panel having two dark areas. When an impermissible deviation is detected, line noise correction will in particular be performed in either case based on the detected line noise with the impermissible deviation "eliminated", and substitute noise correction will be performed.

The effect of the "vertical high-pass behavior of the readout amplifier" in the area of the dark area can be detected and corrected using the line noise correction described here.

BRIEF DESCRIPTION OF THE DRAWINGS

An exemplary embodiment of the invention is explained in more detail below with reference to the drawing, in which, in schematic and highly simplified representations:

FIG. 1 shows a flat-panel detector in the form of a block diagram, and

FIG. 2 shows a schematic signal curve across the bandwidth of a readout amplifier for different situations.

DETAILED DESCRIPTION OF INVENTION

A flat-panel detector 2 according to FIG. 1 has a matrix-type detector panel 4 having a total of n lines and m columns. The detector panel 4 has on its edge sides in each case a plurality of columns covering a radiation-insensitive dark area 6 and between said two dark areas 6 a radiation-sensitive, active area 8. Unlike in the area of the active area 8, in the area of the dark areas 6 the detector panel 4 does not have a photo-active or scintillator layer that generates light quanta which are then detected by semiconductor detectors, not shown in more detail here, when x-rays impinge. In operating modes in which a more extensive subarea of the detector panel 4 is shaded by, for example, masking, the dark areas 6 can also extend to areas which, although in principle having a photo-active coating, are not irradiated in the respective operating mode.

The flat-panel detector 2 furthermore has a driving device 10 for driving the detector panel 4 line by line. Each pixel array of the detector panel 4 includes a semiconductor sensor for registering the light intensity as a measure of the x-rays impinging on the respective pixel array. A total of M sensors of this kind is therefore arranged in one line.

The detector panel 4 further has a plurality of readout amplifiers 12 which in turn have a plurality of individual channels, for example 120, with each channel being assigned to precisely one of the total of m columns. The total of m columns of the detector panel 4 is therefore subdivided into individual column blocks 14, as shown in FIG. 1, each of which is assigned to a readout amplifier 12. As can further be seen from FIG. 1, the dark areas 6 do not necessarily extend across a complete column block 14.

During operation the detector panel 4 is driven via the driving device 10 line by line, which is to say that the detector panel 4 is driven in such a way that one line is in each case read out serially after the other. Each readout amplifier 12 therefore receives line by line the signal data of its columns of the respective column block 14 that are assigned to it. Owing to the evaluation electronics the actual image signals are overlaid by electronic noise emanating in particular from the readout amplifiers 12.

What is termed line noise correction (LNC) is performed in order to at least largely eliminate said noise. A correction factor or correction value is for this purpose determined for each line of the dark area 6. This is customarily the arithmetic mean of the individual noise values of the individual columns channels of the readout amplifier 12 of a respective line. Said correction value is then customarily deducted from the image signals recorded across the active area 8.

If a high-contrast object 16, for example a cardiac pacemaker or metallic implant, is located near the image edge of the dark area 6, as is shown in FIG. 1 by the dark-hatched rectangle, it means there is an area exhibiting very high radiation intensity. Owing to the abrupt and high-contrast transition at the edge areas of the high-contrast object 16 from one line to the next line, on the one hand a type of high-frequency structure is produced which is discernible in the respective line across the entire channel width of the left-hand readout amplifier 12a. This effect is described also as vertical high-pass behavior of the readout amplifier 12a. It is here particularly disadvantageous in terms of noise correction that said effect not only registers the readout amplifier's columns (channels) across which the high-contrast object 16 is located. Rather it is the case that adjoining columns/channels and customarily the entire readout amplifier 12a are also affected. The entire line of the detector panel 4 across all columns is even also in part affected. If this "defective" line of the dark area 6 is then used for determining a correction factor, that will give rise to faulty noise correction. Overall, therefore, faulty line structures can be produced in the clinical image if a high-contrast object 16 of said type is present.

A first possibility for reducing said effect (vertical high-pass behavior of the readout amplifier 12a) is for the dark area 6 to extend at least across the entire channel width of the readout amplifier 12a and thus include a complete column block 14. That is because no abrupt change in contrast would in this case occur within the readout amplifier 12a as it does not, of course, have an "active area". This is facilitated by, for example, suitably collimating the path of the rays with the aid of, for instance, masks. Or lead screening is provided in the edge areas of the detector panel 4. Said measures require considerable expenditure, however, and are therefore impractical.

To correct said effect the present invention provides for the noise signals of the dark area 6 that are registered for noise correction to be checked for impermissible deviations, which is to say for deviations exceeding a specified threshold, and for this then to be taken into consideration for these lines in determining the correction factor or correction value. With this method, in a first step the possible presence of an undesirable effect of said type is therefore identified and in a second step the appropriate conclusions are then drawn for noise correction. This method can be applied both to a detector panel having only one dark area and to detector panels 4 having a plurality of, in particular two, opposite dark areas 6.

FIG. 2 shows an exemplary signal curve S across the entire bandwidth of the left-hand readout amplifier 12a, specifically for two in particular successive lines between which the abrupt change in contrast occurs. The normal line not yet exhibiting any impact of the high-contrast object 16 is here shown as a dotted line, whereas the line affected by the high-contrast object 16 is shown as an unbroken line. The vertical dashed line here schematically subdivides the left-hand area of the readout amplifier 12a assigned to the dark area 6 from the right-hand side of the readout amplifier 12a assigned to the active area 8.

In the normal case (dotted line) and without radiation the signal curve S will vary somewhat around a mean value X. As an arithmetic mean of the individual noise values of the channels of the readout amplifier 12a for the dark area 6, said mean value X is at the same time a suitable correction factor for line noise correction. The horizontal dashed lines also shown in the drawing here indicate an upper and lower tolerance range within which a deviation from the mean value X is still considered permissible. In particular the upper dashed line defines a threshold or limiting value g above which there is an impermissible deviation.

If the high-contrast object 16 is present, said object can be expressed, as shown by the unbroken line, to the effect that light also radiates into the actually non-sensitive dark area 6 so that significantly increased signal values are also produced here for the individual channels/columns. If the detector panel 4 has only one dark area 6, a check will to practical effect be performed to determine whether the individual noise values for each column (individual pixel values) exceed the permitted threshold 9. If they do, they will not be taken into consideration for noise correction. If the number of individual pixel values exceeding the permissible threshold 9 exceed a pre-specified number so as to leave residual pixel values too low in number to determine the correction factor, then the entire line will be left out of consideration for determining the correction factor. In that case an interpolation will then be carried out from preceding or succeeding lines or a mean value will be formed from the correction factors of adjacent lines or a predefined correction factor determined from, for example, the mean value of all line-correction factors will be taken as the basis. If there are two or more dark areas 6, the same procedure can basically be carried out for each dark area. It is alternatively possible to compare the two correction factors of the dark areas 6 with each other and leave the higher correction value out of consideration for line noise correction if a pre-specified difference between the two correction values is exceeded. Both correction values will alternatively be left out of consideration and here, too, an interpolation carried out from adjacent lines or a mean value formed from adjacent lines, or a pre-specified correction factor will be used.

A vertical high-pass behavior of the readout amplifier 12a occasioned by a high-contrast object is in particular detected and effectively corrected in the areas of the dark areas 6 by means of the above-described method so that image artifacts are largely suppressed and avoided. Comparable effects such as the radiation of light into the dark area are at the same time also detected and corrected by means of said method.

The invention claimed is:

1. A method of correcting noise included in an image acquired by a flat-panel-detector having a matrix-type detector panel including a plurality of lines, each for providing a plurality of signals, the matrix-type detector panel including a dark reference zone and an active area, the method comprising:

receiving the plurality of signals from a plurality of read out amplifiers;

detecting, via the signals, a plurality of dark noise contributions in the dark reference zone, each dark noise contribution related to one or more pixels in the dark reference zone on one or more of the lines of the matrix-type detector panel; and providing a first procedure and a second procedure which is different from the first procedure;

for each line of the matrix-type detector panel associated with the dark reference zone;

comparing the detected values of dark noise with a threshold value, calculating correcting parameters based on the comparing, the calculating is in accord to a first procedure when the comparison indicates the detected values of dark noise contributions does not exceed the threshold value, the calculating is in accord to a second procedure when the comparison indicates the detected values of dark noise contributions exceeds the threshold value, and correcting the image based on the flat-panel-detector using the correcting parameters, wherein the first calculation procedure provided for dark noise contributions not exceeding the threshold value, and wherein the second calculation procedure provided for dark noise contributions exceeding the threshold value.

2. The method according to claim 1,
wherein the threshold value is based on a deviation from mean noise signal value calculated from the plurality of noise contributions.

3. The method according to claim 1,
wherein the threshold value is determined using a detected signal step of a first noise level relative to a second noise level, the first and second noise levels related to a first respectively a second line of the matrix-type panel, and the first and second lines arranged adjacent to each other.

4. The method according to claim 1,
wherein each dark noise contribution related to one line of the matrix-type detector panel includes a plurality of column dark noise contributions related to the columns of the matrix-type detector panel, and a deviation of at least one column dark noise contribution from a column noise threshold value is determined.

5. The method according to claim 4, wherein column dark noise contributions deviating from the column noise threshold value are omitted from the calculating of the correcting parameters.

6. The method according to claim 4, wherein calculating the correcting parameters includes omitting all column dark noise contributions from calculating the correcting parameters if more than a number of column dark noise contributions deviate from the column noise threshold value.

7. The method according to claim 6, wherein the calculating of the correcting parameters according to the second procedure includes the number of column dark noise contributions deviating from the column noise threshold value is based on correcting parameters calculated for adjacent lines.

8. The method according to claim 6, wherein calculating the correcting parameters for such lines including the number of column dark noise contributions deviating from the column noise threshold value is based on a correcting parameter.

9. The method according to claim 8, wherein the correcting parameter includes a mean dark noise contribution value calculated from the plurality of dark noise contributions.

10. The method according to claim 1, wherein the matrix-type detector panel includes at least two dark reference zones, a plurality of dark noise contributions related to each dark reference zone is determined, and calculating the correcting parameters is based on the plurality of dark noise contributions.

11. The method according to claim 10, wherein, for each dark reference zone, a mean line dark noise contribution value is calculated for each line of the dark reference zone, and the threshold value for each line is determined relative to the mean line noise value, and fore each line an arithmetic mean of all individual pixel dark noise contributions in the line is only used for calculating correcting parameters when none of the individual dark noise contributions exceed the threshold value.

12. The method according to claim 10, wherein the calculating of the correcting parameters omits all dark noise contributions related to a dark reference zone including dark noise contributions exceeding the threshold value.

13. The method according to claim 1, determining from the comparison for at least one line of the matrix-type detector panel associated with the dark reference zone that the dark noise contribution exceeds the threshold value.

14. The method according to claim 1, determining from the comparison for at least one line of the matrix-type detector panel associated with the dark reference zone that the dark noise contribution does not exceed the threshold value.

15. The method according to claim 1, determining from the comparison for at least one line of the matrix-type detector panel associated with the dark reference zone that the dark noise contribution exceeds the threshold value, and determining from the comparison for at least one further line of the matrix-type detector panel associated with the dark reference zone that the dark noise contribution does not exceed the threshold value.

* * * * *